(No Model.)

C. KOENIG.
SIDE HILL VEHICLE.

No. 507,370. Patented Oct. 24, 1893.

Witnesses:

Inventor,
Christian Koenig
By Dewey & Co.
attys

UNITED STATES PATENT OFFICE.

CHRISTIAN KOENIG, OF SACRAMENTO, CALIFORNIA.

SIDE-HILL VEHICLE.

SPECIFICATION forming part of Letters Patent No. 507,370, dated October 24, 1893.

Application filed June 13, 1893. Serial No. 477,481. (No model.)

*To all whom it may concern:*

Be it known that I, CHRISTIAN KOENIG, a citizen of the United States, residing at Sacramento, Sacramento county, State of California, have invented an Improvement in Side-Hill Vehicles; and I hereby declare the following to be a full, clear, and exact description of the same.

My invention relates to that class of vehicles in which the axle is pivotally mounted in such a manner as will adapt it to be rocked in the direction of its length, whereby the wheels are thrown out of the same horizontal plane, in order that the vehicle may travel conveniently upon sloping ground or side hills.

My invention consists in the novel construction, arrangement and combination of the parts of the vehicle, which I shall hereinafter fully describe and specifically claim.

The object of my invention is to provide a simple and practicable vehicle adapted to travel upon side hills, and which can also be readily converted from a two-wheeled vehicle into a three-wheeled one, and vice versa.

Figure 1:
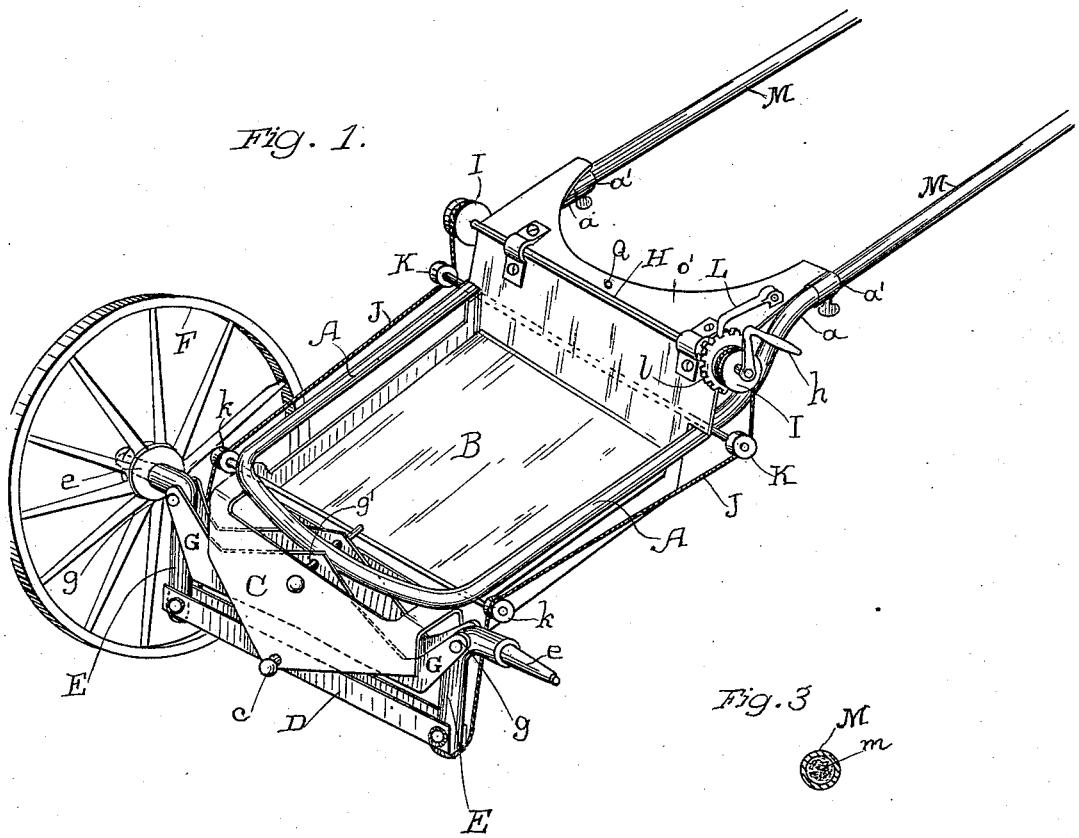
Figure 3:
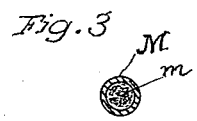
Figure 2:
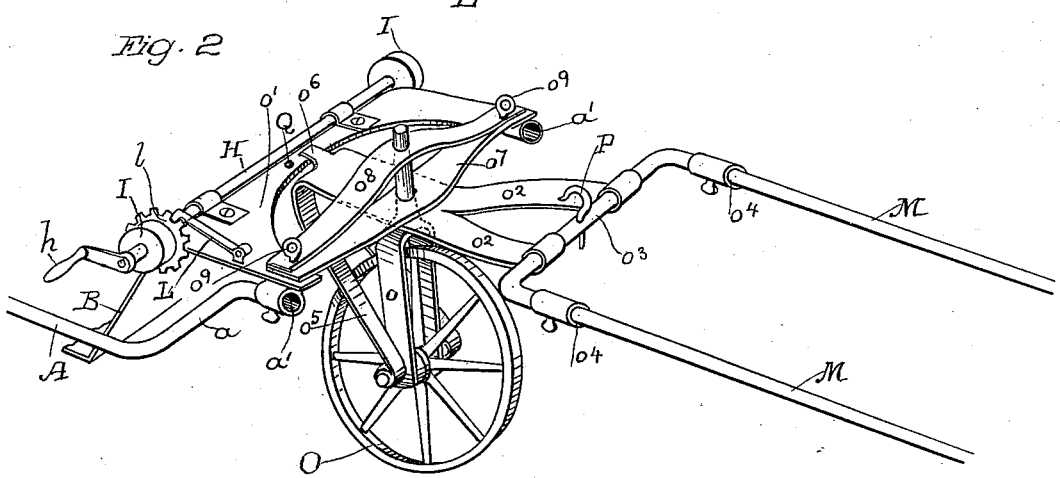

Referring to the accompanying drawings for a complete explanation of my invention, Figure 1 is a perspective view of my vehicle showing it adapted for a two-wheeled vehicle, one of the two wheels being removed. Fig. 2 is a perspective view of the third wheel showing its connections and manner of attachment to the front of the vehicle of Fig. 1. Fig. 3 is a cross section of one of the shafts M.

A is the frame of the vehicle which is preferably made of a tubular piece bent at its middle portion to form the back of the frame, and having its ends $a$ extending forwardly and upwardly and provided with sockets $a'$. B is the body of the vehicle which is properly suspended from this frame. Extending downwardly from the rear end of the frame, is a casting or plate C, in the lower central portion of which is pivoted at $c$ the axle D. To the ends of this axle are pivoted the standards E, the ends of which are bent outwardly and form the spindles $e$ upon which the wheels F are mounted. Pivoted to the upper portions of these standards E, just within the wheels, are the ends $g$ of a connecting lever or levers G, the center of which is pivoted through the back end of the frame A at $g'$.

Upon the forward portion of the vehicle is mounted a shaft H having a means on one end for turning it, such as the crank handle $h$. This shaft carries at its ends the pulleys I upon which the chains, ropes or cables J are secured, and are adapted to be wound. The chain or cable on one pulley winds in an opposite direction thereon to the direction of winding of the chain or cable on the other pulley, so that by the rotation of the shaft one chain or cable is wound up while the other is paid out. These chains or cables pass downwardly from the pulleys I around guide pulleys K, and thence backwardly over suitable guides $k$, and downwardly to and are connected with the ends of the axle. Now, it will be seen that by rotating the shaft in either direction the axle will be rocked on its pivotal center, one end moving downwardly and the other upwardly, so that the standards E which carry the wheels are correspondingly moved, said standards being held together and maintained in a proper upright position by the pivoted connecting lever or levers G. Thus the wheels are thrown out of the same horizontal plane, adapting them to travel with convenience upon sloping ground or side hills.

The shaft H is held in position by means of a lever pawl L engaging a ratchet $l$.

When the device is to be used as a two-wheeled vehicle, shafts M, preferably tubular ones, are to be fitted to the sockets $a'$ at the forward end of the frame, and to be secured therein in suitable manner; but where the device is to be used as a three-wheeled vehicle the shafts are removed from the sockets $a'$, and a third wheel O is supplied, said wheel having a standard $o$ suitably swiveled in the front of the vehicle, and provided with a turn-table or fifth wheel $o'$ of suitable character, which has a forward extension $o^2$ provided with a cross piece $o^3$ with sockets $o^4$ to receive the shafts which are secured therein in suitable manner. The cross piece $o^3$ is journaled in the extension $o^2$ to permit the shafts to play up and down, and said extension at the rear is carried down to form braces $o^5$ on each side of the wheel O, and secured to its axle. The rear of the extension has a tongue $o^6$ which plays over the turn-table. The wheel is further braced by a steel plate $o^7$ and an arched piece $o^8$ both of which are secured by adjustable connections $o^9$ to the forward ends of the frame A.

P is a draft hook in cross piece $o^3$, and Q is a hole in the turn-table to which the draft is made when the device is used as a two-wheeled vehicle. The hollow shafts should preferably be filled with some suitable filling material $m$, such as saw-dust with putty or shellac or oil or other binder to render them stiff and rigid.

Having thus described my invention, what I claim as new, and desire to secure by Letters Patent, is—

1. In a vehicle, the combination of a frame, an axle pivoted at its center to said frame, whereby it may rock in the direction of its length, standards pivoted to the ends of the axle and having spindles, wheels journaled upon the spindles, a lever pivoted to the frame and having its ends pivoted to the standards for holding them together and maintaining their upright position, and means connected with the axle for rocking it in the direction of its length, substantially as herein described.

2. In a vehicle, the combination of a frame, an axle pivoted at its center to said frame, whereby it may rock in the direction of its length, standards pivoted to the ends of the axles and having spindles, wheels journaled upon the spindles, a lever pivoted to the frame and having its ends pivoted to the standards for holding them together and maintaining their upright position, and the means connected with the axle for rocking it in the direction of its length, consisting of the rotatable shaft H having the pulleys and the chains, cables or ropes secured to said pulleys and adapted to wind thereon in reverse directions, said chains, cables or ropes being connected at their other ends with the ends of the axle, substantially as herein described.

3. A side hill vehicle consisting of a suitable frame, a body mounted thereon, a downwardly extending plate at the rear of the frame, an axle pivoted at its center in the lower portion of said plate, whereby it may rock in the direction of its length, standards pivoted in the ends of the axle and having spindles, wheels mounted upon the spindles, the lever pivoted at its ends to the standards and at its center to the rear of the frame, and the means for rocking the axle, consisting of the rotatable shaft having the pulleys and the chains, cables or ropes secured to said pulleys and adapted to wind thereon in reverse directions, said chains cables or ropes being connected at their other ends with the ends of the axle, substantially as herein described.

4. A side hill vehicle adapted to be converted from a two-wheeled into a three-wheeled vehicle, consisting of a frame having the sockets at its forward end adapted to receive the shafts which are to be detachably connected therewith, the rocking axle pivoted to the rear of the frame, the standards with their spindles and wheels pivoted to the axle, the pivoted connecting lever between the standards, the means for rocking the axle, and the front wheel with its standard, turn-table, cross-bar and sockets adapted to removably receive the shafts, substantially as herein described.

5. In a vehicle, the combination of a frame provided with sockets for shafts and having a suitable body and a turn-table piece $o'$ at its front, the bracing plates $o^7$ and $o^8$ removably secured to the frame, the front wheel O with its standard swiveled in said plates, the extension $o^2$ having at its rear end the tongue playing on the turn-table, and the downwardly extending braces to the wheel axle and the cross piece journaled in the front of said extension and having sockets for the shafts, whereby the vehicle may be converted from a two-wheeled into a three-wheeled one and vice versa, substantially as herein described.

6. Vehicle shafts made hollowed and stiffened with a suitable plastic filling material, substantially as herein described.

In witness whereof I have hereunto set my hand.

CHRISTIAN KOENIG.

Witnesses:
S. H. NOURSE,
WM. F. BOOTH.